(12) United States Patent
Gao et al.

(10) Patent No.: US 12,166,231 B2
(45) Date of Patent: Dec. 10, 2024

(54) BATTERY, ELECTRICAL APPARATUS, AND METHOD AND DEVICE FOR MANUFACTURING BATTERY

(71) Applicant: CONTEMPORARY AMPEREX TECHNOLOGY (HONG KONG) LIMITED, Hong Kong (CN)

(72) Inventors: Xiongwei Gao, Ningde (CN); Xiaobo Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 15 days.

(21) Appl. No.: 17/970,615

(22) Filed: Oct. 21, 2022

(65) Prior Publication Data

US 2023/0040343 A1    Feb. 9, 2023

Related U.S. Application Data

(63) Continuation of application No. PCT/CN2021/142950, filed on Dec. 30, 2021.

(30) Foreign Application Priority Data

Feb. 7, 2021   (CN) .......................... 202110169096.4

(51) Int. Cl.
*H01M 50/308*    (2021.01)
*H01M 10/04*    (2006.01)
(Continued)

(52) U.S. Cl.
CPC ..... *H01M 50/308* (2021.01); *H01M 10/0422* (2013.01); *H01M 10/425* (2013.01);
(Continued)

(58) Field of Classification Search
None
See application file for complete search history.

(56) References Cited

U.S. PATENT DOCUMENTS

| | | | |
|---|---|---|---|
| 10,559,798 B2 | 2/2020 | Qin et al. | |
| 2007/0122697 A1* | 5/2007 | Wutz | H01M 50/566 429/180 |

(Continued)

FOREIGN PATENT DOCUMENTS

| | | |
|---|---|---|
| CN | 108666459 A | 10/2018 |
| CN | 208028098 U | 10/2018 |

(Continued)

OTHER PUBLICATIONS

Japanese Notice of Allowance issued Dec. 11, 2023 in corresponding Japanese Patent Application No. 2022-565611, 5 pages.

(Continued)

*Primary Examiner* — Amanda J Barrow
(74) *Attorney, Agent, or Firm* — XSENSUS LLP

(57) ABSTRACT

A battery may include: a battery cell; a housing to accommodate the battery cell, where the housing may include a pressure relief structure to release, out of the housing, emissions induced by thermal runaway of the battery cell; and a charging connector to be electrically connected to the battery cell. The charging connector may include a body portion disposed on a side that is of the housing and that is oriented back from the battery cell, and covers the pressure relief structure. The emissions induced by thermal runaway of the battery cell are able to pass through the pressure relief structure and act on the body portion so that at least a part of the body portion may be triggered to move away from the battery cell to electrically disconnect the charging connector from the battery cell.

15 Claims, 12 Drawing Sheets

(51) Int. Cl.
*H01M 10/42* (2006.01)
*H01M 10/65* (2014.01)
*H01M 50/204* (2021.01)
*H01M 50/578* (2021.01)

(52) U.S. Cl.
CPC ......... *H01M 10/65* (2015.04); *H01M 50/204* (2021.01); *H01M 50/578* (2021.01); *H01M 2220/20* (2013.01)

(56) References Cited

U.S. PATENT DOCUMENTS

| | | | |
|---|---|---|---|
| 2010/0316894 A1* | 12/2010 | Hermann | H01M 50/3425 429/56 |
| 2015/0280205 A1 | 10/2015 | Lee et al. | |
| 2016/0111757 A1* | 4/2016 | Kim | H01M 10/0525 429/61 |
| 2017/0018748 A1 | 1/2017 | Matsuura | |
| 2019/0288256 A1* | 9/2019 | Qin | H01M 50/367 |
| 2019/0288357 A1* | 9/2019 | Son | H01M 10/617 |
| 2019/0305288 A1* | 10/2019 | Jang | H01M 50/103 |
| 2019/0319229 A1* | 10/2019 | Ha | H01M 10/0585 |
| 2019/0372083 A1* | 12/2019 | Ryu | H01M 50/105 |
| 2021/0234242 A1* | 7/2021 | Wu | H01M 50/553 |
| 2022/0200092 A1* | 6/2022 | Zhang | H01M 50/293 |

FOREIGN PATENT DOCUMENTS

| | | |
|---|---|---|
| CN | 109148766 A | 1/2019 |
| CN | 110277533 A | 9/2019 |
| CN | 209401710 U | 9/2019 |
| CN | 110379977 A | 10/2019 |
| CN | 209561492 U | 10/2019 |
| CN | 111490212 A | 8/2020 |
| CN | 211376677 U | 8/2020 |
| CN | 111637259 A | 9/2020 |
| CN | 111668424 A | 9/2020 |
| CN | 111720598 A | 9/2020 |
| CN | 111779866 A | 10/2020 |
| CN | 211629199 U | 10/2020 |
| CN | 211789102 U | 10/2020 |
| EP | 3341986 A1 | 7/2018 |
| JP | H02-112151 A | 4/1990 |
| JP | 2005-108469 A | 4/2005 |
| JP | 2010-287567 A | 12/2010 |
| JP | 2015-115313 A | 6/2015 |
| JP | 2017-091647 A | 5/2017 |
| JP | 2019-160774 A | 9/2019 |
| KR | 20090124110 A | 12/2009 |
| WO | 2011/149223 A2 | 12/2011 |
| WO | 2017/034546 A1 | 3/2017 |
| WO | WO 2019/205951 * | 10/2019 .......... H01M 50/528 |

OTHER PUBLICATIONS

International Search Report and Written Opinion mailed on Mar. 28, 2022, received for PCT Application PCT/CN2021/142950, filed on Dec. 30, 2021, 10 pages including English Translation.

Office Action issued Nov. 30, 2022 in Chine Patent Application No. 202110169096.4 with English Concise Explanation of Relevance, 12 pages.

Extended European Search Report issued Jun. 11, 2024 in European Patent Application No. 21924483.7.

Written Decision on Registration issued Jul. 25, 2024 in Korean Patent Application No. 10-2022-7038746, 6 pages.

* cited by examiner

BATTERY, ELECTRICAL APPARATUS, AND METHOD AND DEVICE FOR MANUFACTURING BATTERY

CROSS-REFERENCE TO RELATED APPLICATIONS

This application is a continuation of International Application No. PCT/CN2021/142950, filed Dec. 30, 2021, which claims priority to Chinese Patent Application No. 202110169096.4, filed on Feb. 7, 2021 and entitled "BATTERY, ELECTRICAL APPARATUS, AND METHOD AND DEVICE FOR MANUFACTURING BATTERY", each of which is incorporated herein by reference in its entirety.

TECHNICAL FIELD

This application relates to the field of batteries, and in particular, to a battery, an electrical apparatus, and a method and device for manufacturing a battery.

BACKGROUND

Due to advantages such as a high energy density, a high power density, reusability for many cycles, a long shelf life, rechargeable batteries have been widely used in electric vehicles, mobile devices, or electric tools. A battery needs to be charged from an external power source. A charging method may be either slow charge or fast flash charge. However, the battery in a charging process is at risk of thermal runaway and is prone to safety hazards such as explosion or fire.

SUMMARY

This application provides a battery, an electrical apparatus, and a method and device for manufacturing a battery to solve safety hazards such as proneness to explosion or fire during thermal runaway.

According to one aspect, this application discloses a battery, including:
  a battery cell;
  a housing, configured to accommodate the battery cell, where the housing includes a pressure relief portion, and the pressure relief portion is configured to release, out of the housing, emissions induced by thermal runaway of the battery cell; and
  a charging connector, configured to be electrically connected to the battery cell, where the charging connector includes a body portion, the body portion is disposed on a side that is of the housing and that is oriented back from the battery cell, and is configured to cover the pressure relief portion, and the emissions induced by thermal runaway of the battery cell are able to pass through the pressure relief portion and act on the body portion so that at least a part of the body portion is triggered to move away from the battery cell to electrically disconnect the charging connector from the battery cell.

The battery according to an embodiment of this application includes a battery cell, a housing, and a charging connector. The battery cell is disposed in the housing. The housing includes a pressure relief portion configured to release internal pressure. The charging connector is disposed on the housing and is electrically connected to the battery cell, so that a charging device can charge the battery cell through the charging connector. The charging connector includes a body portion. The body portion of the charging connector covers the pressure relief portion of the housing. When the battery cell is thermally runaway, the emissions induced by thermal runaway of the battery cell can pass through the pressure relief portion and act on the body portion of the charging connector, so as to exert an impact force on the body portion whereby at least a part of the body portion is triggered to move away from the battery cell. When the body portion is triggered to move, a relative position between the charging connector and the housing can be changed, and the charging connector moves away from the battery cell. In this way, the charging connector can be electrically disconnected from the battery cell, and the charging device stops charging the battery cell. Therefore, when the battery cell is thermally runaway, the charging connector can be electrically disconnected from the battery cell to stop charging the battery cell, thereby effectively alleviating thermal runaway, reducing the possibility of fire or explosion, and improving safety of the battery in use.

According to an embodiment of this application, the housing further includes a guide channel. The guide channel is located on an inner side the housing. The guide channel is configured to guide, to the pressure relief portion, the emissions induced by thermal runaway of the battery cell.

The guide channel helps to collect the thermal runaway-induced emissions and more quickly guide the thermal runaway-induced emissions to the pressure relief portion, thereby shortening the time taken for the thermal runaway-induced emissions to act on the body portion, and further accelerating electrical disconnection between the charging connector and the battery cell.

According to an embodiment of this application, the guide channel includes a confluence cavity and a branch channel. The branch channel communicates with the confluence cavity, and the pressure relief portion is disposed opposite to the confluence cavity.

The emissions induced by thermal runaway of the battery cell can be quickly collected into the confluence cavity along each branch channel, thereby reducing the possibility that the electrical disconnection between the charging connector and the battery cell is relatively slow due to non-directional spread of the emissions.

According to an embodiment of this application, the battery cell is plural in number. Each battery cell includes an explosion-proof valve, and at least one of the plurality of explosion-proof valves is disposed toward the guide channel.

When thermal runaway occurs, the emissions expelled in the explosion-proof valve disposed toward the guide channel can act on the pressure relief portion and the body portion of the charging connector more quickly under the guidance of the guide channel, thereby helping to further accelerate the electrical disconnection between the charging connector and the battery cell.

According to an embodiment of this application, the battery further includes a movement trigger. The movement trigger is connected to the housing, and the movement trigger is configured to exert, on the charging connector, an acting force away from the battery cell.

The movement trigger is configured to provide an auxiliary acting force to the body portion. When the thermal runaway-induced emissions exert an impact force on the body portion of the charging connector, the acting force borne by the body portion is a sum of the impact force of the thermal runaway-induced emissions and the acting force of the movement trigger. In this way, the body portion can be more easily triggered to move, so as to reduce the possibility that the charging connector fails to be electrically disconnected from the battery cell because the charging connector fails to move when the battery cell is thermally runaway.

According to an embodiment of this application, the movement trigger includes an elastic piece. One end of the elastic piece is connected to the body portion, the other end of the elastic piece is connected to the housing, and the elastic piece is configured to exert, on the charging connector, an acting force away from the battery cell.

When thermal runaway occurs, the elastic piece releases an elastic potential energy to exert an acting force on the body portion.

According to an embodiment of this application, the movement trigger includes a mast and an elastic piece. The mast is connected to the body portion. One end of the elastic piece is connected to the mast, the other end of the elastic piece is connected to the housing, and the elastic piece is configured to exert, on the mast, an acting force away from the battery cell.

When thermal runaway occurs, the elastic piece releases an elastic potential energy to move the mast and the body portion upward concurrently.

According to an embodiment of this application, the elastic piece is put on as a sleeve around the mast.

The mast compresses and stretches the elastic piece to provide a guidance effect, so that the force exerted by the elastic piece on the mast or the housing is more concentrated.

According to an embodiment of this application, the movement trigger further includes a covering. The mast and the elastic piece are disposed on a side that is of the body portion and that is oriented toward the battery cell. The covering is configured to accommodate the mast and the elastic piece.

The covering can collect scraps occurring during assembling of the mast and the elastic piece, and reduce the possibility of the scraps entering the battery and causing performance faults of the battery.

According to an embodiment of this application, the charging connector is detachably connected to the housing.

According to an embodiment of this application, the housing includes a fragile region. The fragile region forms the pressure relief portion, and strength of the fragile region is less than strength of other parts of the housing.

According to an embodiment of this application, the housing includes a through-hole. The through-hole forms the pressure relief portion. The battery further includes a sealing element. The sealing element is disposed around the pressure relief portion, and the sealing element is configured to isolate an inner space from an outer space of the housing.

According to an embodiment of this application, the body portion includes a groove, and the groove is disposed toward the pressure relief portion.

With the groove disposed on the body portion of the charging connector, the thermal runaway-induced emissions can pass through the pressure relief portion, and then quickly accumulate in the groove and exert a greater impact force on the body portion.

According to another aspect, this application provides an electrical device. The electrical device includes the battery described above. The battery is configured to provide electrical energy.

According to another aspect, this application provides a method for manufacturing a battery. The method includes:
packaging a battery cell in a housing equipped with a pressure relief portion, where the pressure relief portion is configured to release, out of the housing, emissions induced by thermal runaway of the battery cell;
mounting, on the housing, a charging connector that includes a body portion, so that the body portion is located on a side that is of the housing and that is oriented back from the battery cell, and so that the body portion covers the pressure relief portion; and
electrically connecting the charging connector to the battery cell.

The method for manufacturing a battery according to embodiments of this application can be used to manufacture the battery described above. In the battery manufactured by using the method for manufacturing a battery, the body portion of the charging connector covers the pressure relief portion of the housing. When the battery cell is thermally runaway, the emissions induced by thermal runaway of the battery cell can pass through the pressure relief portion and act on the body portion of the charging connector, so as to exert an impact force on the body portion whereby at least a part of the body portion is triggered to move away from the battery cell. When the body portion is triggered to move, a relative position between the charging connector and the housing is changed, and the charging connector moves away from the battery cell. In this way, the charging connector is electrically disconnected from the battery cell, and the charging device stops charging the battery cell. Therefore, when the battery cell is thermally runaway, the charging connector can be disconnected from the battery cell in time to stop charging the battery cell, thereby effectively alleviating thermal runaway, reducing the possibility of fire or explosion, and improving safety of the battery in use.

According to yet another aspect, this application provides a device for manufacturing a battery. The device includes:
a first apparatus, configured to package a battery cell in a housing equipped with a pressure relief portion, where the pressure relief portion is configured to release, out of the housing, emissions induced by thermal runaway of the battery cell;
a second apparatus, configured to mount, on the housing, a charging connector that includes a body portion; and
a third apparatus, configured to electrically connect the charging connector to the battery cell, where the body portion is located on a side that is of the housing and that is oriented back from the battery cell, and covers the pressure relief portion.

The device for manufacturing a battery according to some embodiments of this application can execute the foregoing method for manufacturing a battery, so as to manufacture the foregoing battery. In the battery manufactured by using the device for manufacturing a battery, the body portion of the charging connector covers the pressure relief portion of the housing. When the battery cell is thermally runaway, the emissions induced by thermal runaway of the battery cell can pass through the pressure relief portion and act on the body portion of the charging connector, so as to exert an impact force on the body portion whereby at least a part of the body portion is triggered to move away from the battery cell. When the body portion is triggered to move, a relative position between the charging connector and the housing is changed, and the charging connector moves away from the battery cell. In this way, the charging connector is electrically disconnected from the battery cell, and the charging device stops charging the battery cell. Therefore, when the battery cell is thermally runaway, the charging connector can be disconnected from the battery cell in time to stop charging the battery cell, thereby effectively alleviating thermal runaway, reducing the possibility of fire or explosion, and improving safety of the battery in use.

BRIEF DESCRIPTION OF DRAWINGS

The following describes features, advantages, and technical effects of exemplary embodiments of this application with reference to accompanying drawings.

Figure 1:
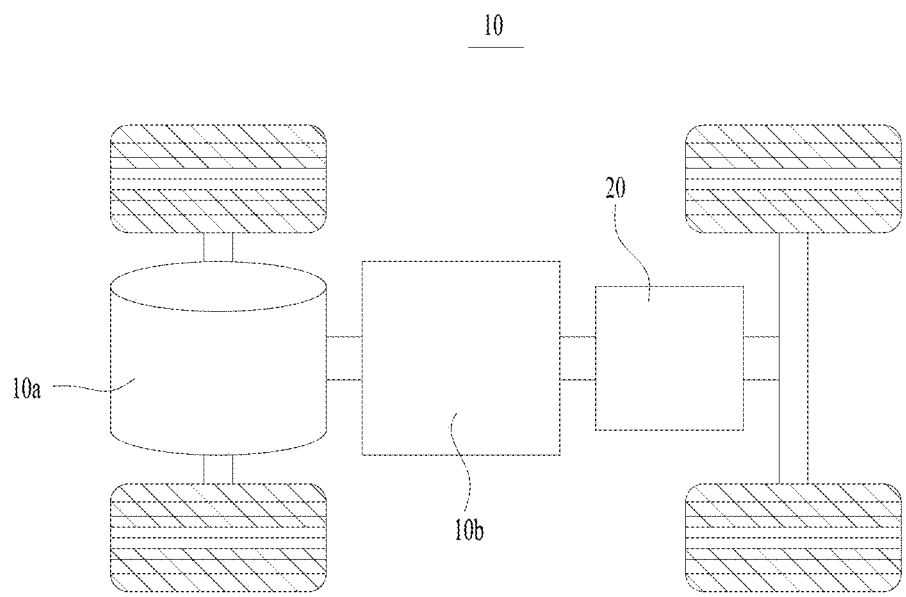
FIG. 1 is a schematic structural diagram of a vehicle according to an embodiment of this application.

The drawings are not necessarily drawn to scale.

DETAILED DESCRIPTION OF EMBODIMENTS

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned apparatus or component is necessarily located in the specified direction or constructed or operated in the specified direction. Therefore, such terms are not to be understood as a limitation on this application. In addition, the terms "first", "second", and "third" are merely intended for descriptive purposes, but are not intended to indicate or imply order of precedence. "Perpendicular" does not means exact perpendicularity, but means perpendicularity falling within an error tolerance range. "Parallel" does not mean exact parallelism, but means parallelism falling within an error tolerance range.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

After finding that the battery in a charging process is at risk of thermal runaway and is prone to safety hazards such as explosion or fire, the applicant has analyzed and researched the battery structure and the charging device. The applicant finds that a battery is prone to thermal runaway when overcharged in a charging process. In addition, at an early stage of thermal runaway, the charging device and the battery are still connected rather than disconnected, thereby resulting in more intense thermal runaway and giving rise to safety hazards such as explosion or fire.

When a battery cell is overheated, short-circuited, overcharged, colliding, or the like, a large amount of gas may be generated inside the battery cell in a short time, and the temperature inside the battery cell may rise rapidly, which may eventually cause the battery cell to explode, catch fire, or the like. This phenomenon is known as thermal runaway of the battery cell.

When the battery cell is thermally runaway, the battery cell emits a large amount of emissions into a battery box. Consequently, in the battery box, a large amount of gas accumulates and the temperature rises, which may eventually cause the battery to explode and catch fire.

The emissions out of the battery cell mentioned in this application include but are not limited to: electrolytic solution, melted or split positive and negative electrode plates, separator scraps, reaction-induced high-temperature and high-pressure gases (for example, flammable gases such as $H_2$ and CO), flames, and the like.

Based on the foregoing problems found by the applicant, the applicant has improved the structure of the battery. The embodiments of this application are further described below.

For a better understanding of this application, the following describes the embodiments of this application with reference to FIG. 1 to FIG. 23.

Referring to FIG. 1, an embodiment of this application provides an electrical apparatus that uses a battery 20 as a power supply. The electrical apparatus may be, but is not limited to, a vehicle, a ship, or an aircraft. Referring to FIG. 1, an embodiment of this application provides a vehicle 10. The vehicle 10 may be an oil-fueled vehicle, a natural gas vehicle, or a new energy vehicle. The new energy vehicle may be a battery electric vehicle, a hybrid electric vehicle, or a range-extended electric vehicle, or the like. In an embodiment of this application, the vehicle 10 includes a battery 20. The battery 20 may be used as a drive power supply of the vehicle 10, and provide driving power for the vehicle 10 in place of or partially in place of oil or natural gas. In an example, the battery 20 may be disposed at the bottom, front, or rear of the vehicle 10. The battery 20 may be configured to electrically power the vehicle 10. In an example, the battery 20 may serve as an operating power supply of the vehicle 10 to power a circuit system of the vehicle 10. Illustratively, the battery 20 may be configured to meet operating power usage requirements of the vehicle 10 that is being started, navigated, or running.

In some embodiments, the vehicle 10 may further include a motor 10a and a controller 10b. The controller 10b is configured to control the battery 20 to supply power to the motor 10a. The motor 10a is connected to wheels of the vehicle through a transmission mechanism to drive the vehicle 10 to run.

In some embodiments, the battery 20 may include a housing 30. The housing 30 includes a box and a cover. The box contains a cavity and an opening. The cover fits on the opening to form the housing.

Figure 2:
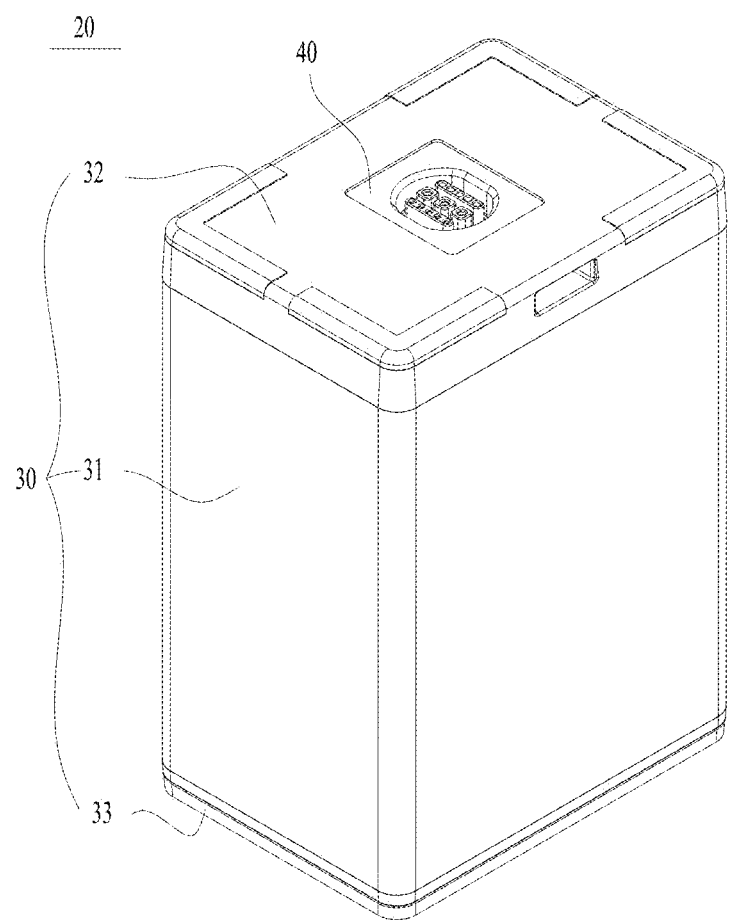
FIG. 2 is a schematic structural diagram of a battery according to an embodiment of this application.
Figure 3:
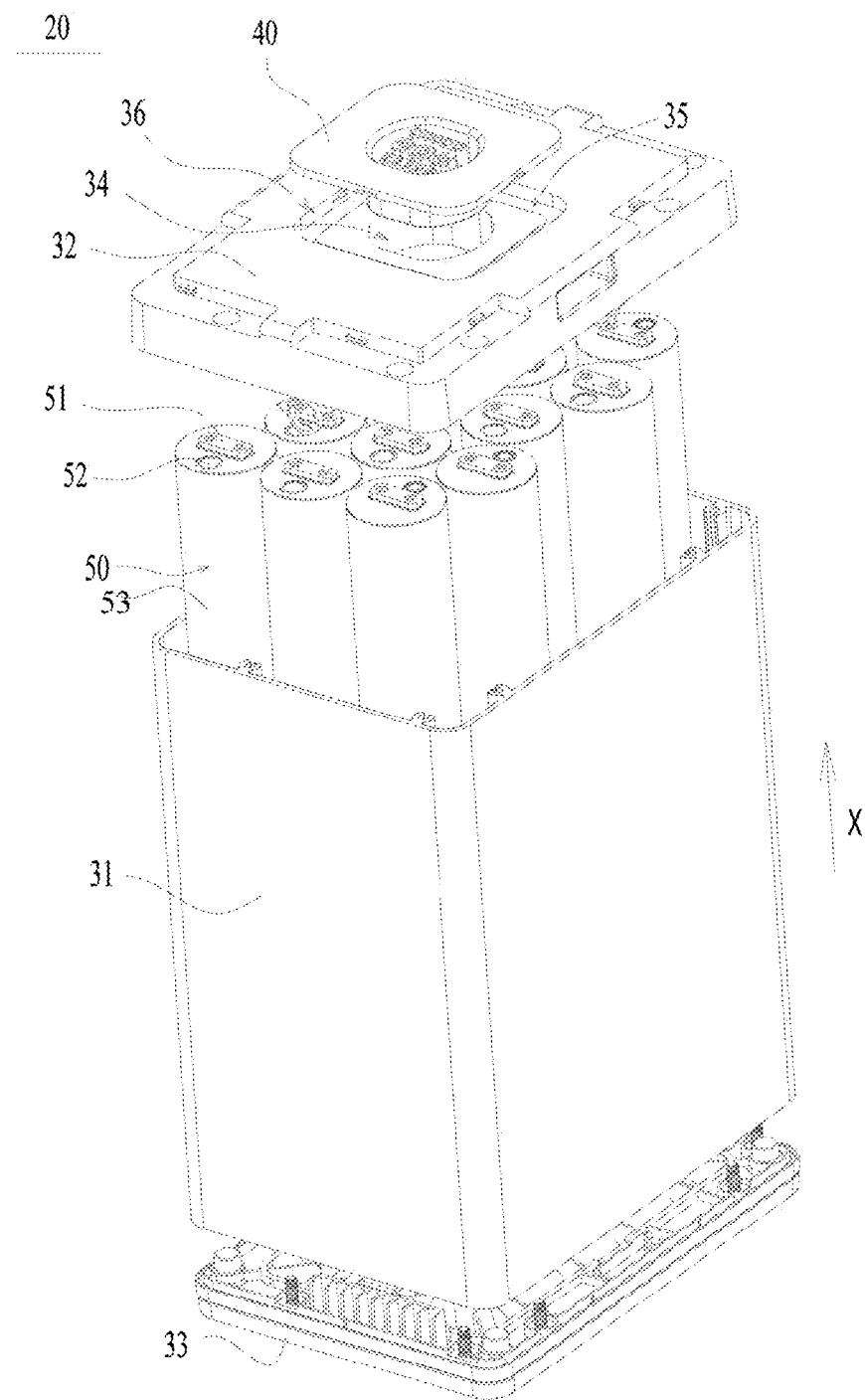
FIG. 3 is a schematic structural exploded view of a battery according to an embodiment of this application.

Referring to FIG. 2 and FIG. 3, the battery 20 may include the housing 30. In an example, the housing 30 includes a cylinder 31, a first cover 32, and a second cover 33. The first cover 32 and the second cover 33 are disposed at two ends of the cylinder 31 along a first direction X, respectively. The first direction X is the same as an axial direction of the cylinder 31. The first cover 32 and the second cover 33 are detachably connected to the cylinder 31, respectively. For example, the first cover 32 and the second cover 33 are snap-fitted or screwed to the cylinder 31, respectively. The cylinder 31, the first cover 32, and the second cover 33 are assembled to form an accommodation space. To meet different power usage requirements, the housing 30 of the battery 20 may contain one or more battery cells 50. The plurality of battery cells 50 may be connected in series, parallel, or series-and-parallel pattern. The series-and-parallel pattern means a combination of series connection and parallel connection. The battery cells 50 include, but are not limited to, a lithium-ion secondary battery, a lithium-ion primary battery, a lithium-sulfur battery, a sodium-lithium-ion battery, or a magnesium-ion battery.

The housing 30 according to this embodiment of this application includes a pressure relief portion or structure 35. The pressure relief portion 35 is configured to release, out of the housing 30, emissions induced by thermal runaway of the battery cell 50, so as to reduce pressure inside the housing 30. The technical solution in this embodiment of this application is described using an example in which the pressure relief portion 35 is disposed on the first cover 32.

The battery cell 50 according to this embodiment of this application includes a casing 53, electrode terminals 51 and an explosion-proof valve 52. The battery cells 50 are electrically connected to each other by the electrode terminals 51. When a battery cell 50 is thermally runaway, the explosion-proof valve 52 of the battery cell 50 bursts to release the pressure inside the battery cell 50.

Figure 4:
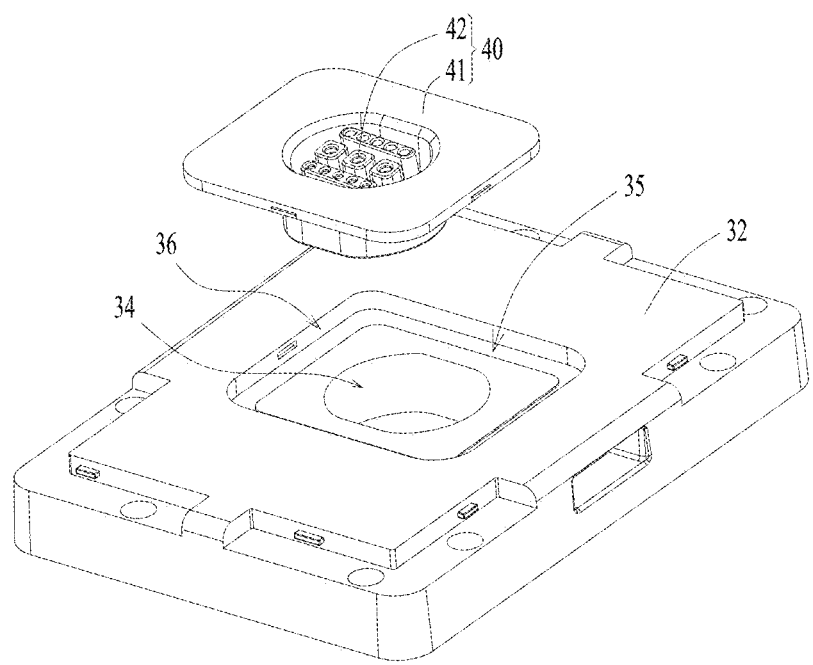
FIG. 4 is a schematic exploded view of a partial structure of a battery according to an embodiment of this application.
Figure 5:
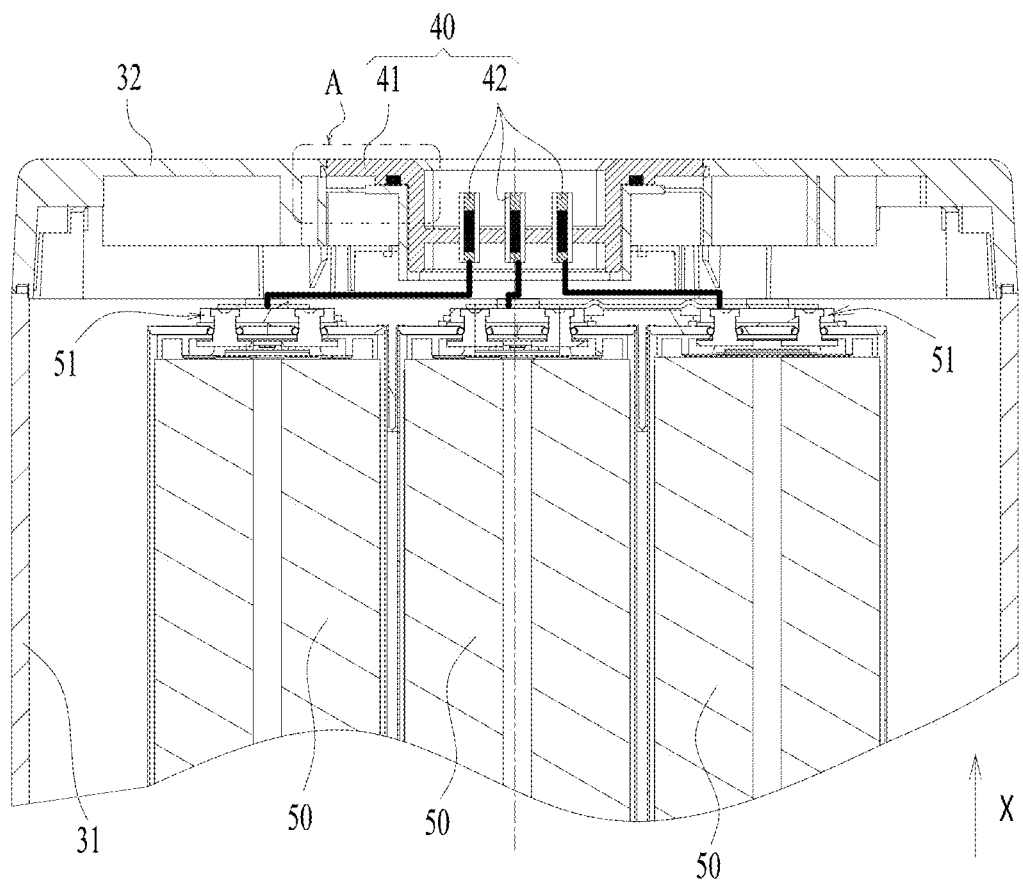
FIG. 5 is a schematic sectional view of a partial structure of a battery in normal use according to an embodiment of this application.

Referring to FIG. 4 and FIG. 5, the battery according to this embodiment of this application further includes a charging connector 40. The charging connector 40 is configured to electrically connect to the battery cell 50. A charging device can charge each battery cell 50 in the battery 20 from outside the battery 20 through the charging connector 40. The charging connector 40 includes a body portion 41. The body portion 41 is disposed on a side that is of the housing 30 and that is oriented back from the battery cell 50, and is configured to cover the pressure relief portion 35. In other words, in the first direction X, an orthographic projection of the body portion 41 covers an orthographic projection of the pressure relief portion 35. Illustratively, the charging connector 40 includes an annular flange. The annular flange forms the body portion 41. The emissions induced by thermal runaway of the battery cell 50 are able to pass through the pressure relief portion 35 and act on the body portion 41 so that at least a part of the body portion 41 is triggered to move away from the battery cell 50 to electrically disconnect the charging connector 40 from the battery cell 50, and in turn, the charging device stops charging the battery cell 50. It is hereby noted that the direction away from the battery cell 50 is the same as the first direction X. Triggered movement means that, when driven by an external force, a structural member at least partly moves or deforms in a preset direction.

The battery 20 according to this embodiment of this application includes a battery cell 50, a housing 30, and a charging connector 40. The battery cell 50 is disposed in the housing 30. The housing 30 includes a pressure relief portion 35 configured to release internal pressure. The charging connector 40 is disposed on the housing 30 and is electrically connected to the battery cell 50, so that a charging device can charge the battery cell 50 through the charging connector 40. The charging connector 40 includes a body portion 41. The body portion 41 of the charging connector 40 covers the pressure relief portion 35 of the housing 30. When the battery cell 50 is thermally runaway, the emissions induced by thermal runaway of the battery cell 50 can pass through the pressure relief portion 35 and act on the body portion 41 of the charging connector 40, so as to exert an impact force on the body portion 41 whereby at least a part of the body portion 41 is triggered to move away from the battery cell 50. When the body portion 41 is triggered to move, a relative position between the charging connector 40 and the housing 30 can be changed, and the charging connector 40 moves away from the battery cell 50. In this way, the charging connector 40 can be electrically disconnected from the battery cell 50, and the charging device stops charging the battery cell 50. Therefore, when the battery cell 50 is thermally runaway, the charging connector 40 can be electrically disconnected from the battery cell 50 to stop charging the battery cell 50, thereby effectively alleviating thermal runaway, reducing the possibility of fire or explosion, and improving safety of the battery 20 in use.

In some embodiments, the charging connector 40 further includes a wiring unit 42. The charging connector 40 is electrically connected to the electrode terminals 51 by the wiring unit 42. A mounting hole 34 is made on the housing 30. A part of the charging connector 40 can be inserted into the mounting hole 34 of the housing 30. In a radial direction of the mounting hole 34, the part that is of the housing 30 and that forms the mounting hole 34 can limit the position of the charging connector 40.

In some embodiments, the charging connector 40 is entirely located on an outer side of the housing 30. The charging connector 40 can cover the mounting hole 34 of the housing 30.

Figure 6:
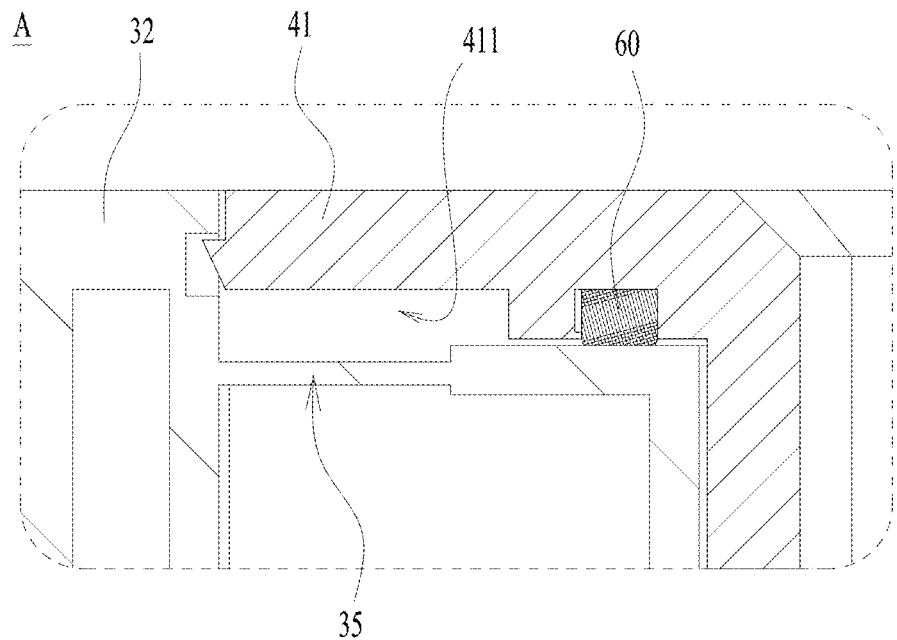
FIG. 6 is a close-up view of a position A shown in FIG. 5.

In some embodiments, referring to FIG. 6, the housing 30 includes a fragile region. The fragile region forms a pressure relief portion 35.

The strength of the fragile region is less than the strength of other parts of the housing 30, so that the emissions induced by thermal runaway of the battery cell 50 can easily break the fragile region and be released out of the housing 30. Illustratively, a part of the housing 30 is thinned to form the fragile region. Alternatively, a part of the housing 30 may be made of a material that can be easily broken by high-temperature and high-pressure emissions ejected from inside the battery cell 50.

Figure 7:
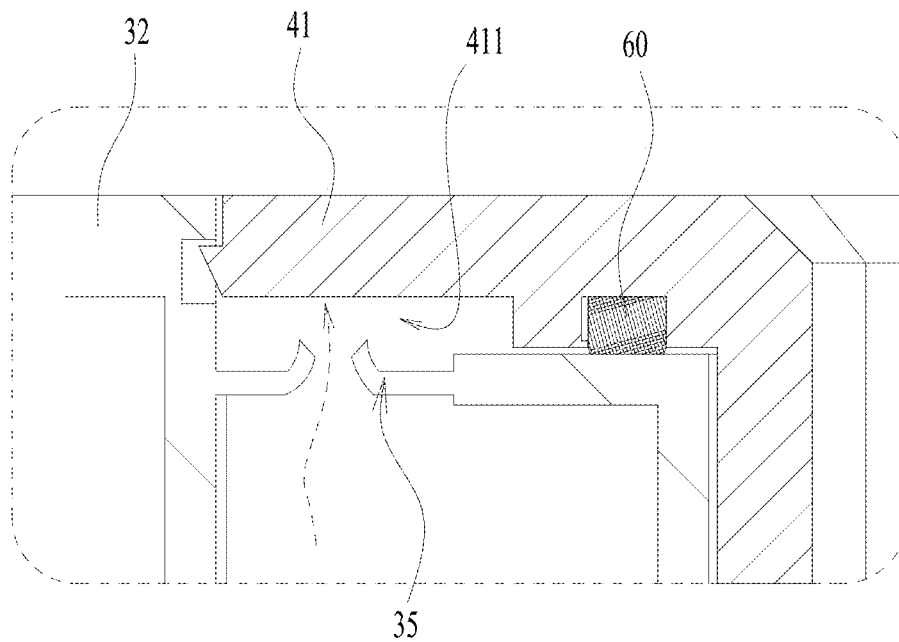
FIG. 7 is a schematic sectional view of a partial structure of a thermally runaway battery according to the embodiment shown in FIG. 6.

Referring to FIG. 7, when the battery cell 50 is thermally runaway, the thermal runaway-induced emissions act on a surface that is of the pressure relief portion 35 and that is oriented toward the battery cell 50, thereby exerting an impact force on the pressure relief portion 35 to break and destroy at least a part of the pressure relief portion 35. After passing through the pressure relief portion 35, the thermal runaway-induced emissions act on the surface that is of the body portion 41 and that is oriented toward the pressure relief portion 35, thereby exerting an impact force on the body portion 41.

Figure 8:
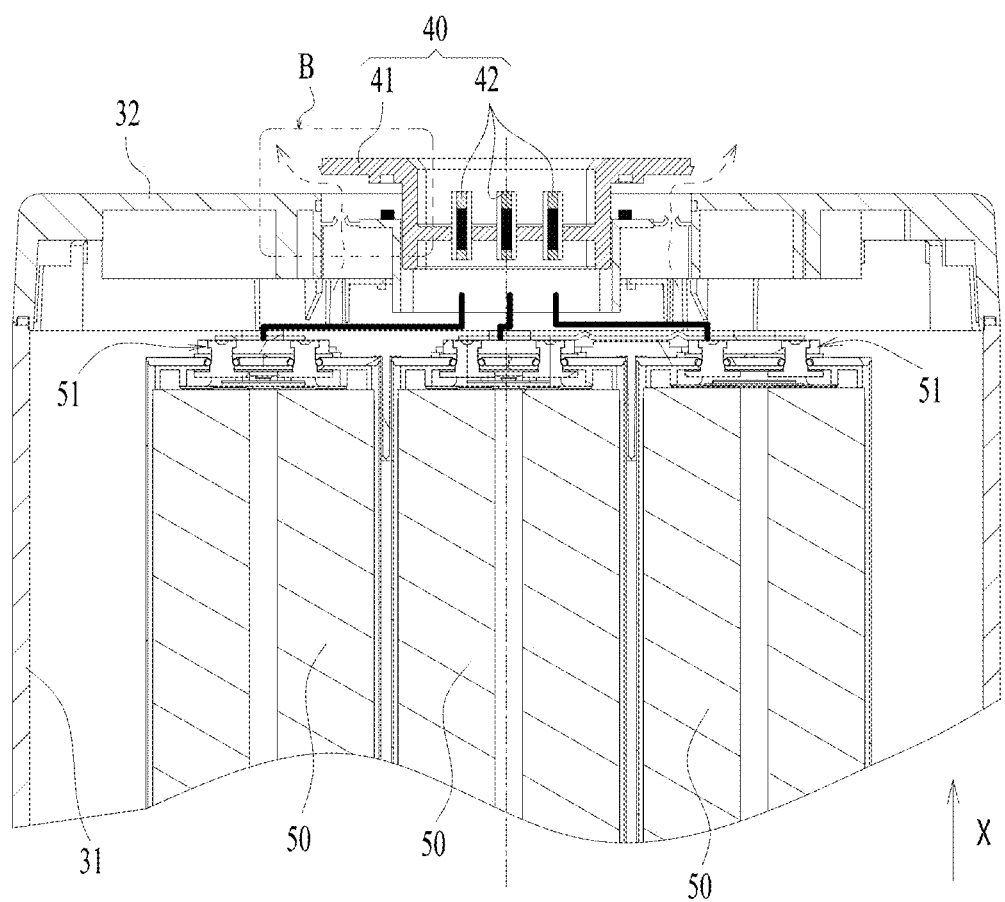
FIG. 8 is a schematic sectional view of a partial structure of a thermally runaway battery according to the embodiment shown in FIG. 6.
Figure 9:
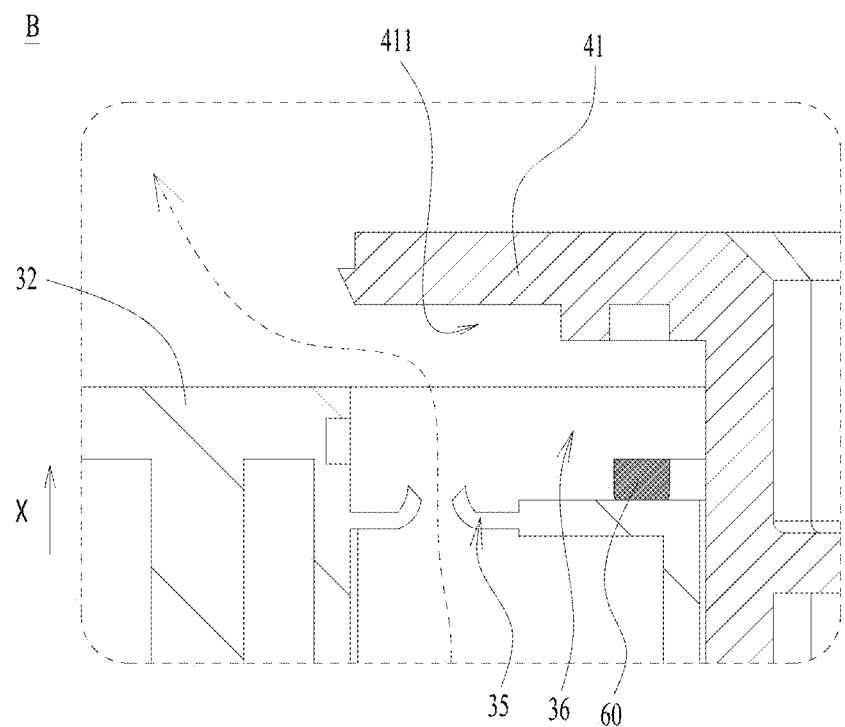
FIG. 9 is a close-up view of a position B shown in FIG. 8.

Referring to FIG. 8 and FIG. 9, when the body portion 41 receives the impact force, the body portion 41 is disconnected, and thereby detached, from the housing 30, so as to displace the charging connector 40 along the first direction X. After the charging connector 40 is displaced, the charging connector 40 is electrically disconnected from the electrode terminals 51 of the battery cell 50, and the thermal runaway-induced emissions can be expelled through a gap between the body portion 41 and the housing 30 to release internal pressure of the battery 20. The function of releasing the pressure of the battery 20 and the function of cutting off the electrical connection between the charging connector 40 and the battery cell 50 can be implemented by combined use of the charging connector 40 and the housing 30.

Illustratively, the charging connector 40 may be electrically connected to the electrode terminals 51 by using a wire of a preset length. The displacement of the charging connector 40 can snap off the wire to cut off the electrical connection with the electrode terminals 51. Alternatively, the charging connector 40 may be connected to a bonding pad, and the electrode terminals 51 are also connected to the bonding pad. The displacement of the charging connector 40 makes the charging connector 40 detach from the bonding pad to cut off the electrical connection with the electrode terminals 51.

In some examples, the pressure relief portion 35 on the housing 30 is an annular structure. The pressure relief portion 35 on the housing 30 may be an open ring or a closed ring. Alternatively, the number of pressure relief portions 35 on the housing 30 is two or more. The pressure relief portions 35 are spaced apart from each other and distributed in a ring shape.

In some embodiments, the charging connector 40 and the housing 30 are detachably connected to facilitate manufacture and assembling of the charging connector 40 and the housing 30. Illustratively, the charging connector 40 and the housing 30 are snap-fitted to each other. Of the body portion 41 of the charging connector 40 and the housing 30, one includes a snap hole, and the other includes a snap bulge that is snap-fitted to the snap hole. When the charging connector 40 receives an impact force, the snap bulge comes out of the snap hole, so that the body portion 41 is disconnected from the housing 30.

In some embodiments, the charging connector 40 and the housing 30 are bonded to each other. The charging connector 40 is bonded to the housing 30 by glue. When the charging connector 40 receives an impact force, at least one of the charging connector 40 or the housing 30 is disconnected from the glue, so that the body portion 41 is disconnected from the housing 30.

In some embodiments, referring to FIG. 9, a recessed portion 36 is made on the housing 30. The recessed portion 36 is formed by being recessed toward an inner surface of the housing from an outer surface of the housing 30. The recessed portion 36 is opened back from the battery cell 50. At least a part of the body portion 41 of the charging connector 40 sinks into the recessed portion 36, so as to downsize the battery 20 in the first direction X and help to improve an energy density of the battery 20. A side wall near the housing 30 and on the body portion 41 of the charging connector 40 may be connected to the housing 30.

In some embodiments, referring to FIG. 6 to FIG. 9, a groove 411 is made on the body portion 41 of the charging connector 40. A surface that is of the body portion 41 and that is oriented toward the housing 30 is in a stepped shape so that the groove 411 is formed at a position that is on the body portion 41 and that is oriented toward the pressure relief portion 35. The groove 411 is made toward the pressure relief portion 35, so that a gap exists between the pressure relief portion 35 and the surface that is of the body portion 41 and that is oriented toward the pressure relief portion 35. On the one hand, when the pressure relief portion 35 receives an impact force, a part of the pressure relief portion 35 is broken only if everted. The groove 411 of the body portion 41 can form an avoidance structure. In this way, when the battery cell 50 is thermally runaway, it is ensured that a part of the pressure relief portion 35 is everted successfully and broken, thereby reducing the possibility that the pressure relief portion 35 fails to be everted as restricted by the body portion 41 when the pressure relief portion 35 is subjected to an impact force, and in turn, the pressure relief portion 35 fails to be broken. On the other hand, with the groove 411 disposed on the body portion 41 of the charging connector 40, the thermal runaway-induced emissions can pass through the pressure relief portion 35, and then quickly accumulate in the groove 411 and exert a greater impact force on the body portion 41.

Figure 10:
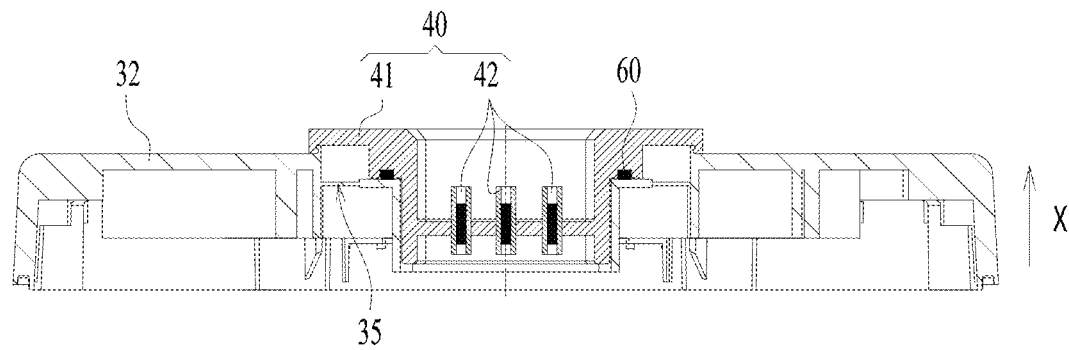
FIG. 10 is a schematic sectional view of a partial structure of a battery in normal use according to another embodiment of this application.
Figure 11:
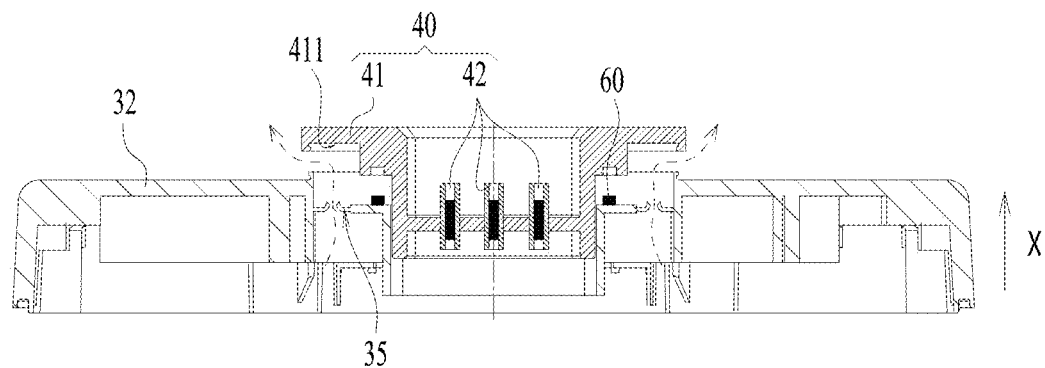
FIG. 11 is a schematic sectional view of a partial structure of a thermally runaway battery according to the embodiment shown in FIG. 10.

In some embodiments, referring to FIG. 10 and FIG. 11, the housing 30 includes an annular flange that protrudes outward. The body portion 41 is connected to the annular flange. Illustratively, of the body portion 41 of the charging connector 40 and the annular flange, one includes a snap hole, and the other includes a snap bulge that is snap-fitted to the snap hole. Alternatively, the charging connector 40 and the annular flange are bonded to each other. For example, the charging connector 40 is bonded to the annular flange by glue. When the charging connector 40 receives an impact force, the body portion 41 is disconnected from the annular flange. After the charging connector 40 is displaced along the first direction X, the thermal runaway-induced emissions can be expelled through a gap between the annular flange and the body portion 41.

Figure 12:
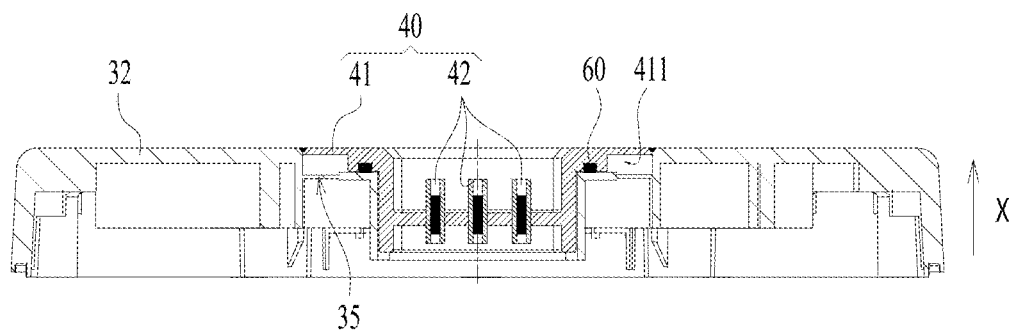
FIG. 12 is a schematic sectional view of a partial structure of a battery in normal use according to another embodiment of this application.
Figure 13:
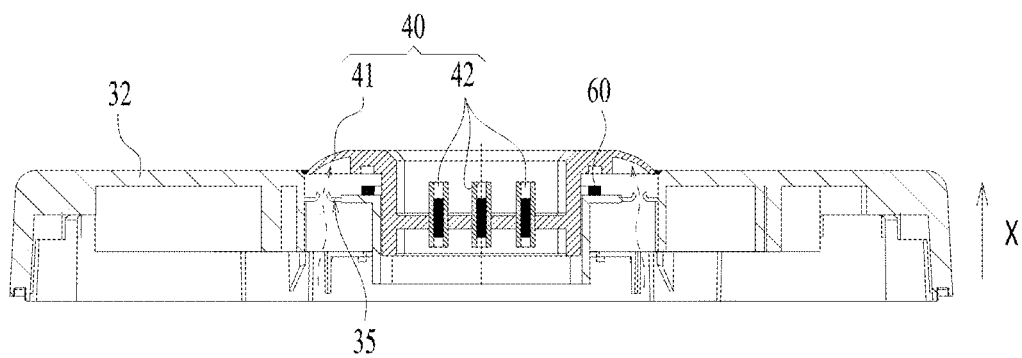
FIG. 13 is a schematic sectional view of a partial structure of a thermally runaway battery according to the embodiment shown in FIG. 12.

In some embodiments, referring to FIG. 12 and FIG. 13, the body portion 41 of the charging connector 40 is fastened to the housing 30. When the pressure relief portion 35 is broken, the thermal runaway-induced emissions act on the body portion 41 to impact the body portion 41. After being impacted, the body portion 41 may bulge and deform away from the pressure relief portion 35. At the same time, the charging connector 40 is entirely displaced along the first direction X and electrically disconnected from the battery cell 50. However, the body portion 41 keeps connected to the housing 30, without being detached. Illustratively, the body portion 41 may be made of a material that does not rebound easily after being impacted by the high-temperature and high-pressure emissions ejected out of the battery cell 50. In this way, the body portion 41 does not rebound any longer after being deformed by the thermal runaway-induced emissions that are high-temperature and high-pressure substances, thereby reducing the possibility that the charging connector 40 moves toward the battery cell 50 to electrically connect to the battery cell 50 again. Illustratively, the body portion 41 may be made of a material such as polyethylene, polyvinyl chloride, polypropylene, or other plastic. In an example, the body portion 41 of the charging connector 40 may be connected to the housing 30 by welding.

In some embodiments, referring to FIG. 12, the housing 30 includes a fragile region. A part of the housing 30 is thinned to form the fragile region, and the fragile region forms a pressure relief portion 35. The battery 20 further includes a sealing element 60. The pressure relief portion 35 is disposed around the sealing element 60. The sealing element 60 seals the charging connector 40 and the housing 30, thereby preventing external moisture from entering the battery 20 through the gap between the charging connector 40 and the housing 30 to adversely affect the battery 20. Illustratively, the sealing element 60 is an annular sealing ring or an annular sealant. The sealing element 60 may be made of rubber or silicone.

Figure 14:
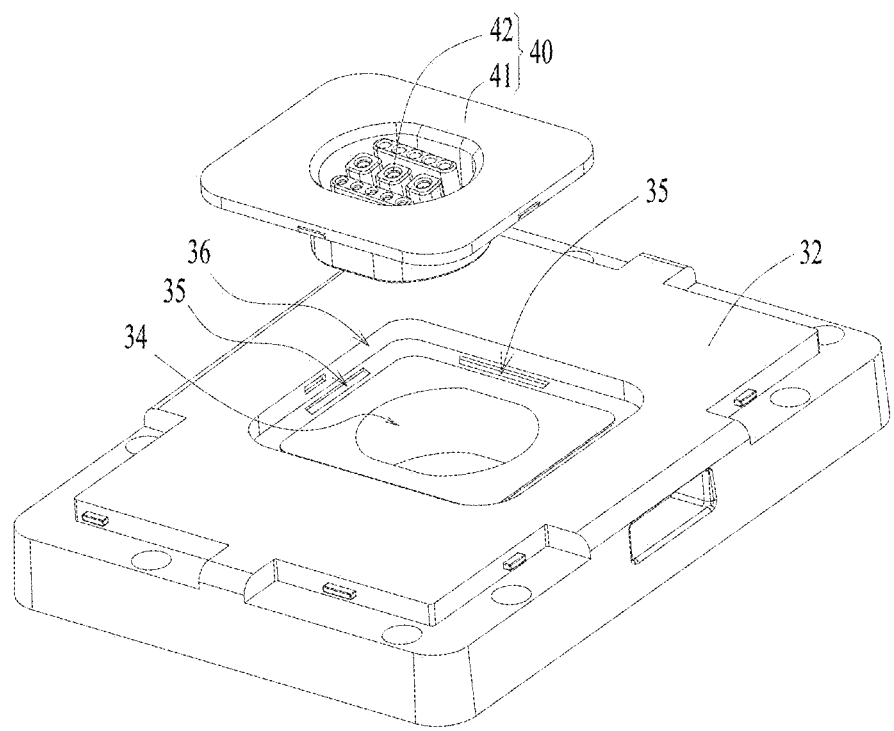
FIG. 14 is a schematic exploded view of a partial structure of a battery according to another embodiment of this application.
Figure 15:
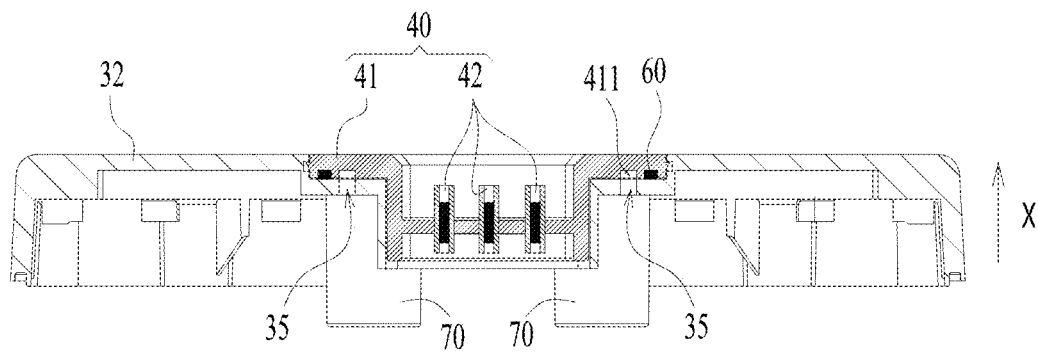
FIG. 15 is a schematic sectional view of a partial structure of a battery in normal use according to another embodiment of this application.

In some embodiments, referring to FIG. 14 and FIG. 15, a through-hole is made on the housing 30. The through-hole penetrates both an outer surface and an inner surface of the housing 30. An axial direction of the through-hole may be the same as the first direction X. The through-hole forms the pressure relief portion 35. The thermal runaway-induced emissions can quickly pass through the through-hole and act on the body portion 41 of the charging connector 40.

Figure 16:
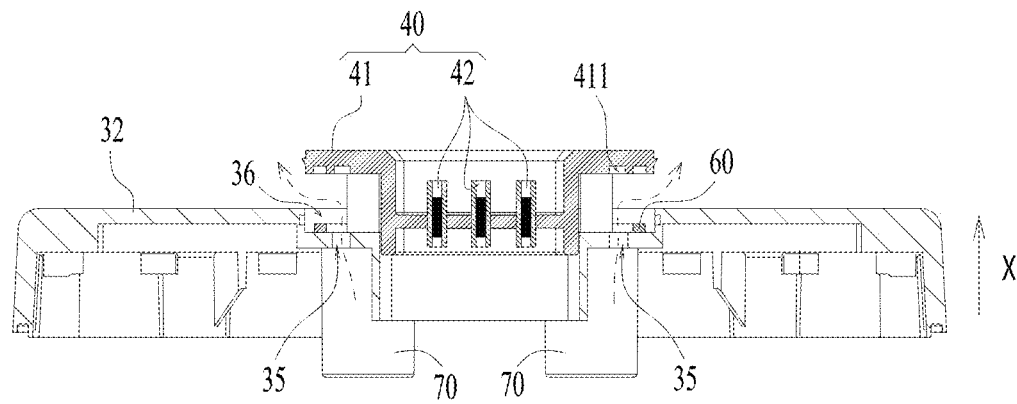
FIG. 16 is a schematic sectional view of a partial structure of a thermally runaway battery according to the embodiment shown in FIG. 15.

Referring to FIG. 16, when the body portion 41 of the charging connector 40 is impacted, the charging connector 40 is displaced along the first direction X and can be electrically disconnected from the battery cell 50. The through-hole made on the housing 30 to form the pressure relief portion 35 makes it convenient for the thermal runaway-induced emissions to quickly and directly act on the body portion 41 of the charging connector 40 to exert an impact force on the body portion 41.

Illustratively, the number of through-holes may be two or more. The two or more through-holes are distributed annularly. The two or more through-holes distributed evenly help to ensure that the body portion 41 is stressed equally on the whole, and reduce the possibility that the body portion 41 is not easily detached from the housing 30 due to tilt of the body portion 41. After the charging connector 40 is displaced along the first direction X, the thermal runaway-induced emissions can be expelled through the through-hole and the gap between the housing 30 and the body portion 41.

In some examples, a recessed portion 36 is made on the housing 30. The through-hole penetrates a bottom wall of the recessed portion 36.

In some embodiments, referring to FIG. 15, a through-hole is made on the housing 30. The through-hole forms the pressure relief portion 35. A sealing element 60 is disposed between the charging connector 40 and the housing 30. The sealing element 60 is disposed around the pressure relief portion 35. The sealing element 60 is configured to isolate an inner space from an outer space of the housing 30, so as to prevent external moisture from entering the battery 20 through the gap between the charging connector 40 and the housing 30 to adversely affect the battery 20 on the one hand. On the other hand, this reduces the possibility of failure of triggering the body portion 41 to move because the thermal runaway-induced emissions leak from the gap between the body portion 41 and the housing 30 and exert a deficient impact force on the body portion 41.

In some embodiments, a through-hole is made on the housing 30. The through-hole forms the pressure relief portion 35. Two groups of sealing elements 60 are disposed between the charging connector 40 and the housing 30. Each group of sealing elements 60 includes at least one sealing element 60. The pressure relief portion 35 is located between the two groups of sealing elements 60. A group of sealing elements 60 located on an inner side the pressure relief portion 35 is configured to isolate the inner space from the outer space of the housing 30. A group of sealing elements 60 located on an outer side of the pressure relief portion 35 is configured to isolate the inner space from the outer space of the housing 30 to prevent the emissions expelled out of the pressure relief portion 35 from leaking to the outer space of the housing 30 through the gap between the body portion 41 and the housing 30, thereby reducing the possibility that the body portion 41 is not easily detachable from the housing 30 because the emissions are leaked and exert a deficient impact force on the body portion 41. It is hereby noted that the inner side of the pressure relief portion 35 means a side that is of the pressure relief portion 35 and that is oriented toward the wiring unit 42 along a direction perpendicular to the first direction X, and the outer side of the pressure relief portion 35 means a side that is of the pressure relief portion 35 and that is oriented back from the wiring unit 42 along the direction perpendicular to the first direction X. As shown in FIG. 15, the sealing element 60 is located on the outer side of the pressure relief portion 35.

Figure 17:
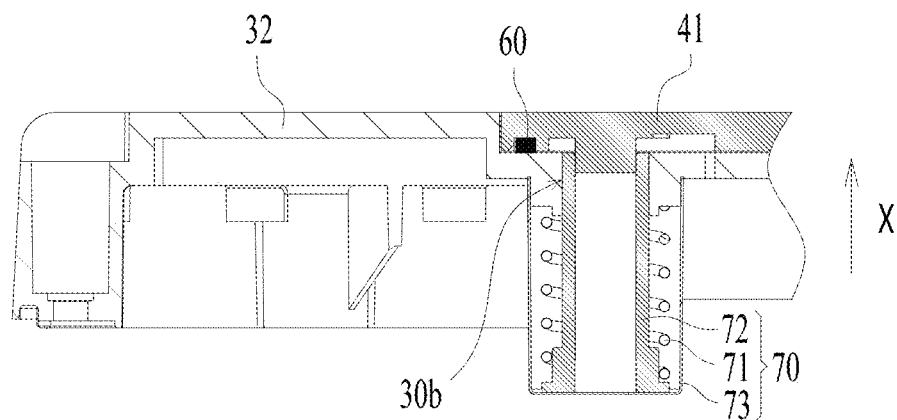
FIG. 17 is a schematic sectional view of a partial structure of a battery that includes a movement trigger according to an embodiment of this application.
Figure 18:
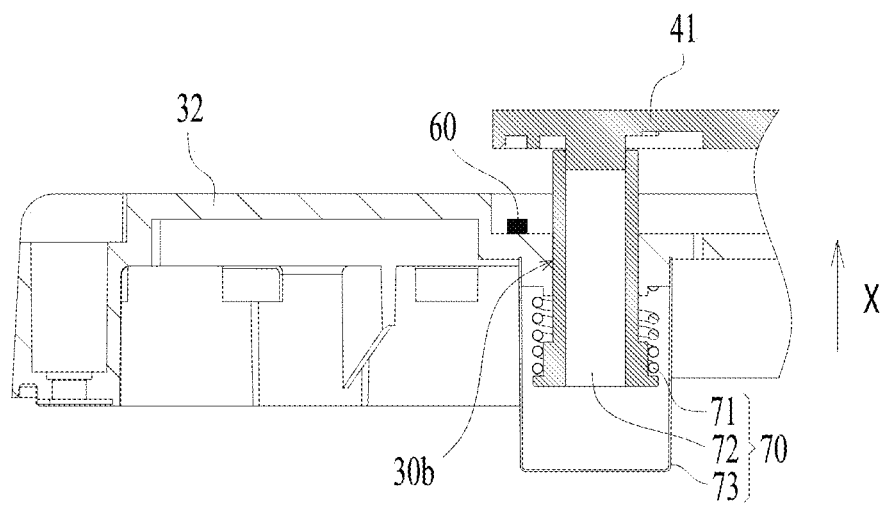
FIG. 18 is a schematic sectional view of a partial structure of a movement trigger pushing a charging connector according to the embodiment shown in FIG. 17.

In some embodiments, referring to FIG. 17 and FIG. 18, the battery 20 further includes a movement trigger 70. The movement trigger 70 is connected to the housing 30, and is configured to exert, on the charging connector 40, an acting force away from the battery cell 50. The movement trigger 70 is configured to provide an auxiliary acting force to the body portion 41. When the thermal runaway-induced emissions exert an impact force on the body portion 41 of the charging connector 40, the acting force borne by the body portion 41 is a sum of the impact force of the thermal runaway-induced emissions and the acting force of the movement trigger 70. In this way, the body portion 41 can be more easily triggered to move, so as to reduce the possibility that the charging connector 40 fails to be electrically disconnected from the battery cell 50 because the charging connector 40 fails to move when the battery cell 50 is thermally runaway. Illustratively, the number of movement triggers 70 is two or more. The two or more movement triggers 70 are distributed annularly and evenly, thereby helping to ensure that the body portion 41 is stressed equally.

In some examples, referring to FIG. 17, the movement trigger 70 includes an elastic piece or structure 71 and a mast 72. The mast 72 is connected to the body portion 41. One end of the elastic piece 71 is connected to the mast 72, and the other end is connected to the housing 30. The elastic piece 71 is configured to exert, on the mast 72, an acting force away from the battery cell 50. A first through-hole 30b is made on the housing 30, and the mast 72 passes through the first through-hole 30b. The mast 72 may move relative to the housing 30 along an axial direction of the first through-hole 30b. The axial direction of the first through-hole 30b may be the same as the first direction X.

When the body portion 41 is connected to the housing 30, the mast 72 and the housing 30 jointly stretch the elastic piece 71 so that the elastic piece 71 is in a stretched state.

Figure 19:
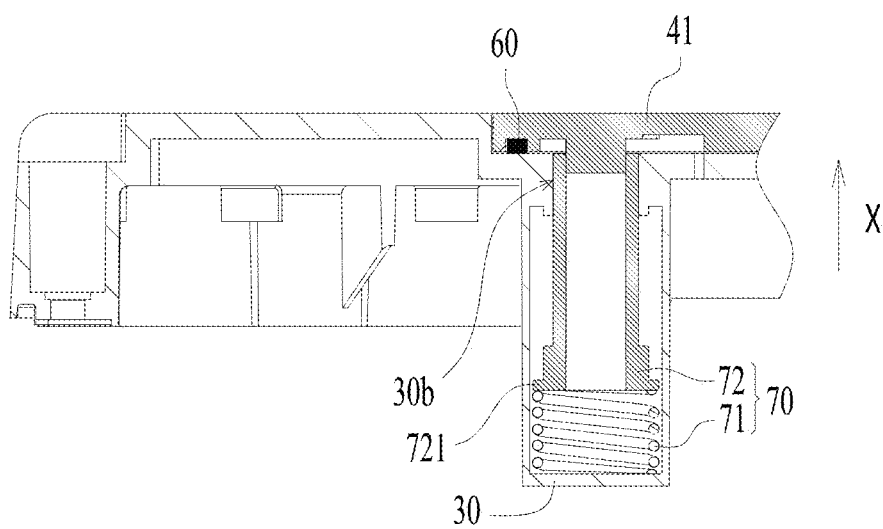
FIG. 19 is a schematic sectional view of a partial structure of a battery that includes a movement trigger according to another embodiment of this application.

Alternatively, referring to FIG. 19, a blocking portion 721 is disposed at an end that is of the mast 72 and that is away from the body portion 41. One end of the elastic piece 71 is connected to the blocking portion 721, and the other end is connected to the housing 30. The mast 72 and the housing 30 jointly compress the elastic piece 71 so that the elastic piece 71 is in a compressed state. When thermal runaway occurs, the elastic piece 71 releases an elastic potential energy to move the mast 72 and the body portion 41 upward concurrently. Illustratively, the elastic piece 71 may be a spring or an elastic rubber block.

In some examples, referring to FIG. 17, the elastic piece 71 is put on as a sleeve around the mast 72. The mast 72 can provide guidance for a compression process or stretching process of the elastic piece 71.

In some examples, the movement trigger 70 further includes a covering 73. The mast 72 and the elastic piece 71 are disposed on a side that is of the body portion 41 and that is oriented toward the battery cell 50. The covering 73 is configured to accommodate the mast 72 and the elastic piece 71. The covering 73 is disposed inside the housing 30. The covering 73 may be detachably connected to the housing 30. The covering 73 can collect scraps occurring during assembling of the mast 72 and the elastic piece 71, and reduce the possibility of the scraps entering the battery 20 and causing performance faults of the battery 20.

Figure 20:
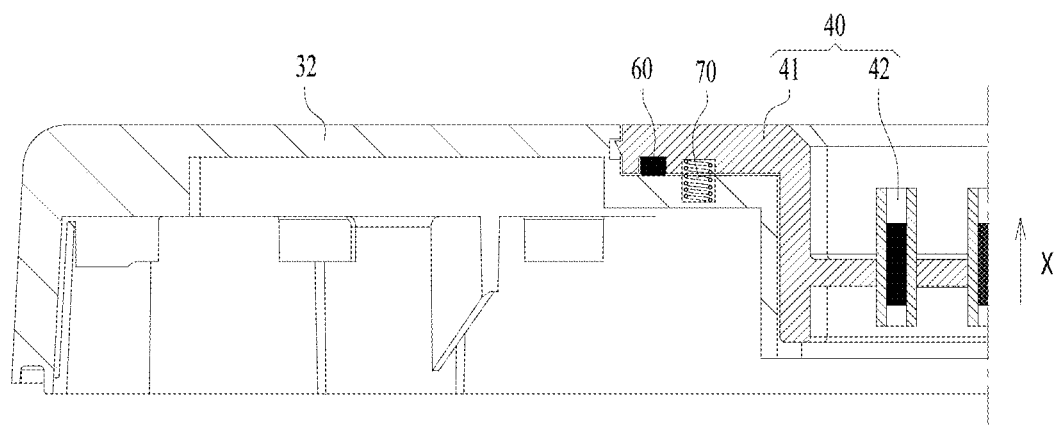
FIG. 20 is a schematic sectional view of a partial structure of a battery that includes a movement trigger according to another embodiment of this application.
Figure 21:
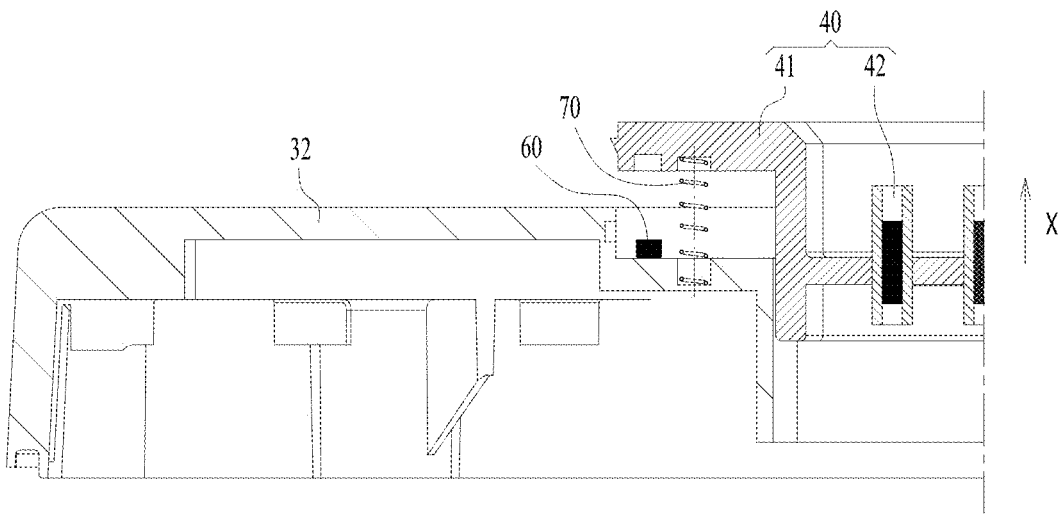
FIG. 21 is a schematic sectional view of a partial structure of a movement trigger pushing a charging connector according to the embodiment shown in FIG. 20.

In some examples, referring to FIG. 20 and FIG. 21, the movement trigger 70 includes the elastic piece 71. The elastic piece 71 is disposed between the body portion 41 and the housing 30. When the body portion 41 is connected to the housing 30, the elastic piece 71 is in a compressed state. One end of the elastic piece 71 may be connected to the body portion 41, and the other end may be connected to the housing 30. When thermal runaway occurs, the elastic piece 71 releases an elastic potential energy to exert an acting force on the body portion 41. Illustratively, the elastic piece 71 may be a coil spring, torsion spring, or an elastic rubber block.

Figure 22:
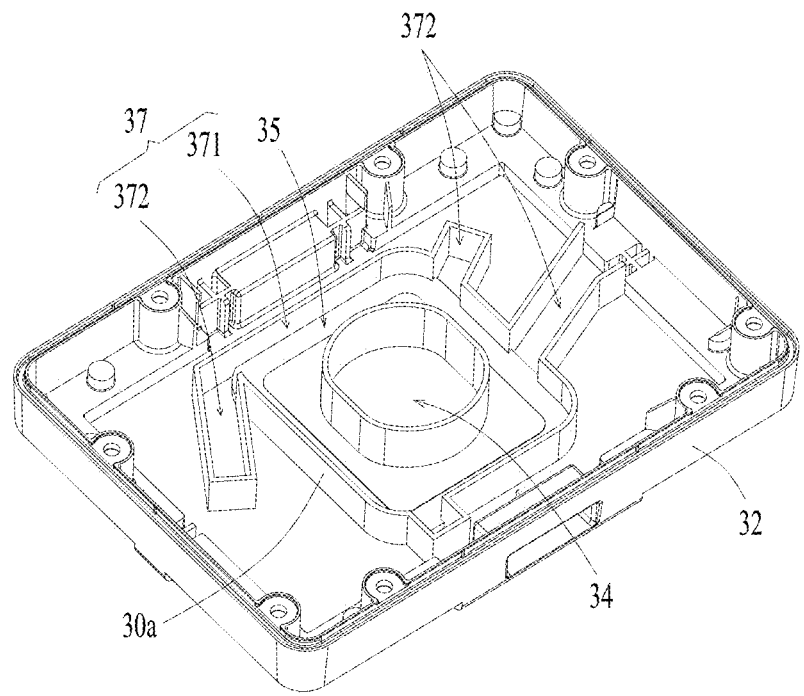
FIG. 22 is a schematic diagram of a partial structure of a battery that includes a guide channel according to an embodiment of this application.

In some embodiments, referring to FIG. 22, the housing 30 further includes a guide channel 37. The guide channel 37 is located on an inner side of the housing 30. The guide channel 37 is configured to guide, to the pressure relief portion 35, the emissions induced by thermal runaway of the battery cell 50. The guide channel 37 helps to collect the thermal runaway-induced emissions and more quickly guide the thermal runaway-induced emissions to the pressure relief portion 35, thereby shortening the time taken for the thermal runaway-induced emissions to act on the body portion 41, and further accelerating electrical disconnection between the charging connector 40 and the battery cell 50.

In some examples, referring to FIG. 22, the guide channel 37 includes a confluence cavity 371 and a branch channel 372. The branch channel 372 communicates with the confluence cavity 371. Emissions induced by thermal runaway of the battery cell 50 can accumulate in the confluence cavity 371 and act on the pressure relief portion 35. In the first direction X, the pressure relief portion 35 is disposed opposite to the confluence cavity 371. That the pressure relief portion 35 is disposed opposite to the confluence cavity 371 means that, in the first direction X, a projection of the pressure relief portion 35 at least partly overlaps a projection of the confluence cavity 371. The emissions induced by thermal runaway of the battery cell 50 can be quickly collected into the confluence cavity 371 along each branch channel 372, thereby reducing the possibility that the electrical disconnection between the charging connector 40 and the battery cell 50 is relatively slow due to non-directional spread of the thermal runaway-induced emissions.

Illustratively, ribs 30a are disposed on the inner side of the housing 30. The ribs 30a close in to form the guide channel 37. In the first direction X, a gap exists between the ribs 30a and the battery cell 50.

Alternatively, a recessed portion is made on the inner side of the housing 30. The recessed portion is recessed toward the outer surface from the inner surface of the housing 30. The recessed portion is opened toward the battery cell 50. The recessed portion forms the guide channel 37.

Figure 23:
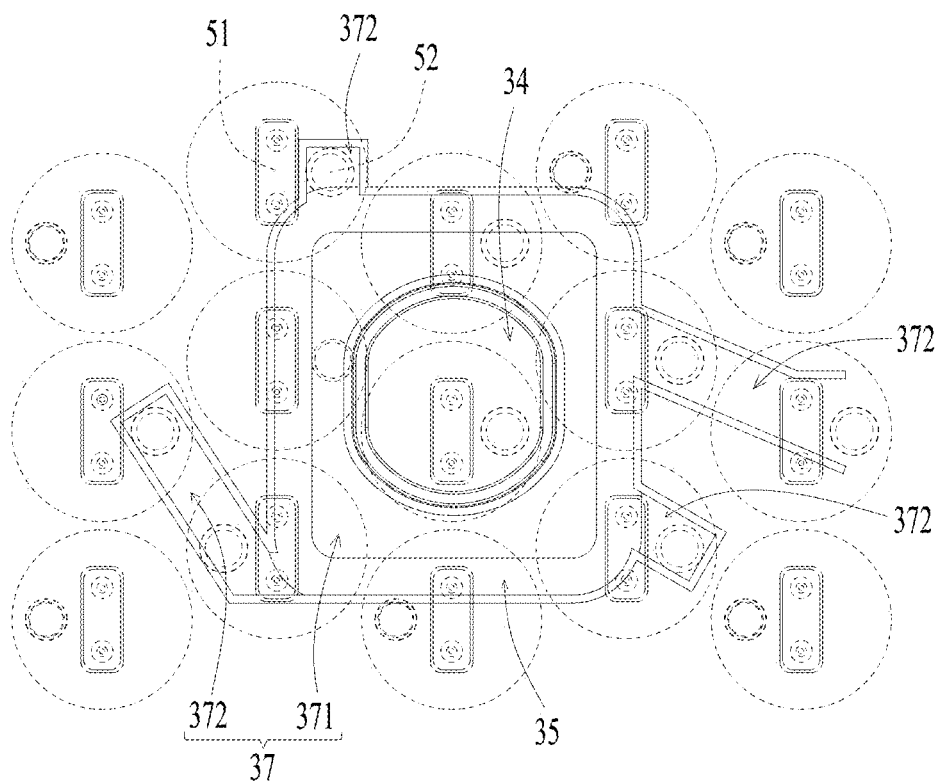
FIG. 23 is a schematic diagram of a positional relationship between a guide channel and an explosion-proof valve according to an embodiment of this application.

In some embodiments, as shown in FIG. 23, there are a plurality of battery cells 50. Each battery cell 50 includes an explosion-proof valve 52. At least one of the plurality of explosion-proof valves 52 is disposed toward the guide channel 37. When thermal runaway occurs, the emissions expelled in the explosion-proof valve 52 disposed toward the guide channel 37 can act on the pressure relief portion 35 and the body portion 41 of the charging connector 40 more quickly under the guidance of the guide channel 37, thereby helping to further accelerate the electrical disconnection between the charging connector 40 and the battery cell 50.

Figure 24:
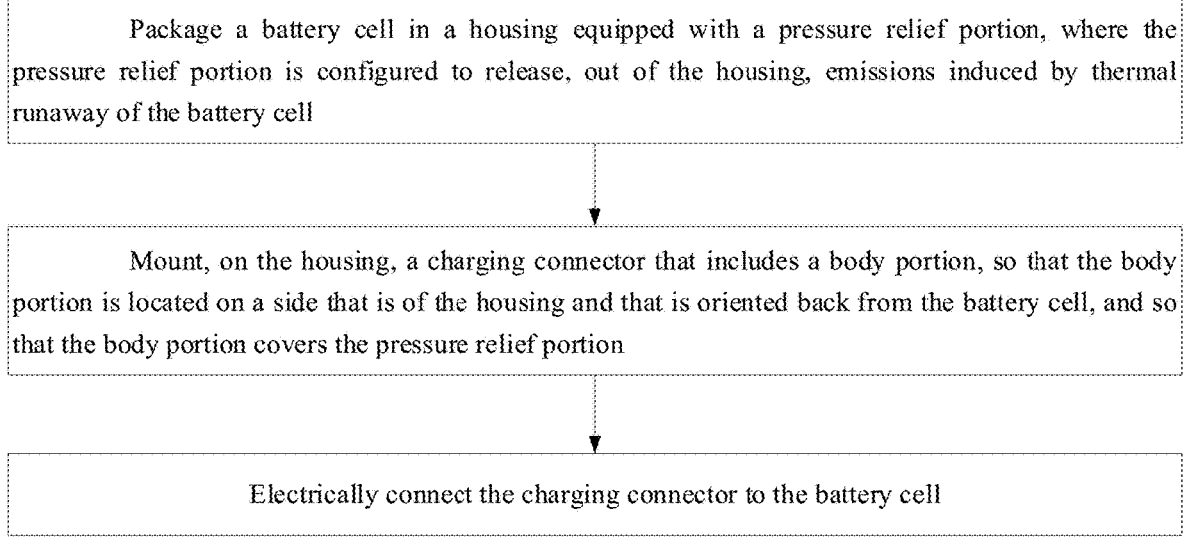
FIG. 24 is a schematic flowchart of a method for manufacturing a battery according to an embodiment of this application.

Referring to FIG. 24, an embodiment of this application further provides a method for manufacturing a battery 20. The method includes:

packaging a battery cell 50 in a housing 30 equipped with a pressure relief portion 35, where the pressure relief portion 35 is configured to release, out of the housing 30, emissions induced by thermal runaway of the battery cell 50;

mounting, on the housing 30, a charging connector 40 that includes a body portion 41, so that the body portion 41 is located on a side that is of the housing 30 and that is oriented back from the battery cell 50, and so that the body portion covers the pressure relief portion 35; and electrically connecting the charging connector 40 to the battery cell 50.

The method for manufacturing a battery 20 according to this embodiment of this application can be used to manufacture the battery 20 described above. In the battery 20 manufactured by using the method for manufacturing a battery 20, the body portion 41 of the charging connector 40 covers the pressure relief portion 35 of the housing 30. When the battery cell 50 is thermally runaway, the emissions induced by thermal runaway of the battery cell 50 can pass through the pressure relief portion 35 and act on the body portion 41 of the charging connector 40, so as to exert an impact force on the body portion 41 whereby at least a part of the body portion 41 is triggered to move away from the battery cell 50. When the body portion 41 is triggered to move, a relative position between the charging connector 40 and the housing 30 is changed, and the charging connector 40 moves away from the battery cell 50. In this way, the charging connector 40 is electrically disconnected from the battery cell 50, and the charging device stops charging the battery cell 50. Therefore, when the battery cell 50 is thermally runaway, the charging connector 40 can be disconnected from the battery cell 50 in time to stop charging the battery cell 50, thereby effectively alleviating thermal runaway, reducing the possibility of fire or explosion, and improving safety of the battery 20 in use.

Figure 25:
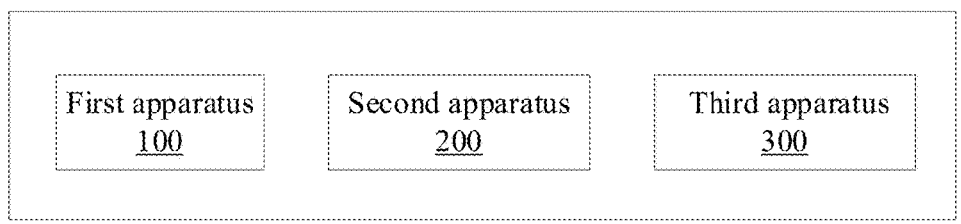
FIG. 25 is a schematic structural diagram of a device for manufacturing a battery according to an embodiment of this application.

Referring to FIG. 25, an embodiment of this application further provides a device for manufacturing a battery 20. The device includes:

a first apparatus 100, configured to package a battery cell 50 in a housing 30 equipped with a pressure relief portion 35, where the pressure relief portion 35 is configured to release, out of the housing 30, emissions induced by thermal runaway of the battery cell 50;

a second apparatus 200, configured to mount, on the housing 30, a charging connector 40 that includes a body portion 41; and a third apparatus 300, configured to electrically connect the charging connector 40 to the battery cell 50, where the body portion 41 is located on a side that is of the housing 30 and that is oriented back from the battery cell 50, and covers the pressure relief portion 35.

The device for manufacturing a battery 20 according to this embodiment of this application can execute the foregoing method for manufacturing a battery 20, so as to manufacture the foregoing battery 20. In the battery 20 manufactured by using the device for manufacturing a battery 20, the body portion 41 of the charging connector 40 covers the pressure relief portion 35 of the housing 30. When the battery cell 50 is thermally runaway, the emissions induced by thermal runaway of the battery cell 50 can pass through the pressure relief portion 35 and act on the body portion 41 of the charging connector 40, so as to exert an impact force on the body portion 41 whereby at least a part of the body portion 41 is triggered to move away from the battery cell 50. When the body portion 41 is triggered to move, a relative position between the charging connector 40 and the housing 30 is changed, and the charging connector 40 moves away from the battery cell 50. In this way, the charging connector 40 is electrically disconnected from the battery cell 50, and the charging device stops charging the battery cell 50. Therefore, when the battery cell 50 is thermally runaway, the charging connector 40 can be disconnected from the battery cell 50 in time to stop charging the battery cell 50, thereby effectively alleviating thermal runaway, reducing the possibility of fire or explosion, and improving safety of the battery 20 in use.

Although this application has been described with reference to exemplary embodiments, various improvements may be made to the embodiments without departing from the scope of this application, and the components of this application may be replaced with equivalents. Particularly, to the extent that no structural conflict exists, various technical features mentioned in various embodiments may be combined in any manner. This application is not limited to the specific embodiments disclosed herein, but includes all technical solutions falling within the scope of the claims.

What is claimed is:

1. A battery, comprising:
a battery cell comprising a casing;
a housing to accommodate the battery cell comprising the casing, wherein the housing comprises a pressure relief structure to release, out of the housing, emissions induced by thermal runaway of the battery cell; and
a charging connector electrically connected to the battery cell, wherein the charging connector comprises a body portion, the body portion is disposed on a side of the housing that is oriented back from the battery cell, and covers the pressure relief structure,
wherein under a condition that the emissions induced by the thermal runaway of the battery cell passes through the pressure relief structure, the emissions act on the body portion so that at least a part of the body portion is triggered to move upward and away from the battery cell to electrically disconnect the charging connector from the battery cell.

2. The battery according to claim 1, wherein the housing further comprises a guide channel, the guide channel is located on an inner side of the housing, and the guide channel guides, to the pressure relief structure, the emissions induced by the thermal runaway of the battery cell.

3. The battery according to claim 2, wherein the guide channel comprises a confluence cavity and a branch channel, the branch channel communicates with the confluence cavity, and the pressure relief structure is disposed opposite to the confluence cavity.

4. The battery according to claim 2, wherein the battery comprises a plurality of battery cells, and the plurality of battery cells comprises a plurality of explosion-proof valves, and at least one of the plurality of explosion-proof valves is disposed toward the guide channel.

5. The battery according to claim 1, wherein the battery further comprises a movement trigger, the movement trigger is connected to the housing, and the movement trigger exerts, on the charging connector, an acting force away from the battery cell before the condition that the emissions induced by the thermal runaway of the battery cell passes through the pressure relief structure.

6. The battery according to claim 5, wherein the movement trigger comprises an elastic structure, one end of the elastic structure is connected to the body portion, the other end of the elastic structure is connected to the housing, and the elastic structure exerts, on the charging connector, the acting force away from the battery cell.

7. The battery according to claim 5, wherein the movement trigger comprises a mast and an elastic structure, the mast is connected to the body portion at a side of the body portion toward the battery cell, one end of the elastic structure is connected to the mast, the other end of the elastic structure is connected to the housing, and the elastic structure exerts, on the mast, the acting force away from the battery cell.

8. The battery according to claim 7, wherein the movement trigger further comprises a covering, the mast and the elastic structure are disposed on a side of the body portion that is oriented toward the battery cell, and the covering accommodates the mast and the elastic structure.

9. The battery according to claim 8, wherein the elastic structure is a sleeve around the mast.

10. The battery according to claim 1, wherein the charging connector is detachably connected to the housing.

11. The battery according to claim 1, wherein the housing comprises a fragile region, the fragile region forms the pressure relief structure, and strength of the fragile region is less than strength of other parts of the housing.

12. The battery according to claim 1, wherein the housing comprises a through-hole, the through-hole forms the pressure relief structure, the battery further comprises a sealing element, the sealing element is disposed around the pressure relief structure, and the sealing element isolates an inner space from an outer space of the housing.

13. The battery according to claim 1, wherein the body portion comprises a groove, and the groove is disposed toward the pressure relief structure.

14. An electrical apparatus, comprising the battery according to claim 1, wherein the battery is configured to provide electrical energy.

15. A method for manufacturing the battery according to claim 1, comprising:

packaging the battery cell in the housing equipped with the pressure relief structure, wherein the pressure relief structure releases, out of the housing, the emissions induced by the thermal runaway of the battery cell;

mounting, on the housing, the charging connector that comprises the body portion, so that the body portion is located on the side that is of the housing and that is oriented back from the battery cell, and so that the body portion covers the pressure relief structure; and electrically connecting the charging connector to the battery cell.

* * * * *